(12) United States Patent
Tomaschke

(10) Patent No.: US 7,001,518 B1
(45) Date of Patent: Feb. 21, 2006

(54) LOW PRESSURE REVERSE OSMOSIS AND NANOFILTRATION MEMBRANES AND METHOD FOR THE PRODUCTION THEREOF

(75) Inventor: John Edward Tomaschke, San Diego, CA (US)

(73) Assignee: Hydranautics, Oceanside, CA (US)

( * ) Notice: Subject to any disclaimer, the term of this patent is extended or adjusted under 35 U.S.C. 154(b) by 0 days.

(21) Appl. No.: 09/724,883

(22) Filed: Nov. 28, 2000

(51) Int. Cl.
*B01D 39/14* (2006.01)

(52) U.S. Cl. ............... 210/500.38; 210/500.23; 210/500.41; 210/654; 210/490; 264/48; 427/245

(58) Field of Classification Search ............ 210/654, 210/500.38, 500.23, 500.41, 490; 264/48; 427/245
See application file for complete search history.

(56) References Cited

U.S. PATENT DOCUMENTS

| | | | |
|---|---|---|---|
| 4,259,183 A | 3/1981 | Cadotte | |
| 4,277,344 A | 7/1981 | Cadotte | |
| 4,520,044 A | 5/1985 | Sundet | |
| 4,761,234 A | 8/1988 | Uemura et al. | |
| 4,765,897 A | 8/1988 | Cadotte et al. | |
| 4,812,270 A | 3/1989 | Cadotte et al. | |
| 4,872,984 A | 10/1989 | Tomaschke | |
| 4,983,291 A * | 1/1991 | Chau et al. | 210/490 |
| 5,254,261 A | 10/1993 | Tomaschke et al. | |
| 6,063,278 A * | 5/2000 | Koo et al. | 210/500.38 |

* cited by examiner

*Primary Examiner*—W. L. Walker
*Assistant Examiner*—K. S. Menon
(74) *Attorney, Agent, or Firm*—Gordon & Rees LLP

(57) ABSTRACT

Novel low pressure reverse osmosis and nanofiltration membranes and a process for their preparation are disclosed. Polyamide reverse osmosis membranes are contacted with organic sulfonic acid solutions without the need for additional treatment by a rejection enhancing agent. These membranes provide sodium chloride rejections of greater than 20 percent and water fluxes greater than 15 gallons per square foot per day at a test pressure of 75 psi. Optimally treated membranes when tested similarly on 0.2 percent magnesium sulfate provide rejections greater than 95 percent with water fluxes greater than 15 gallons per square foot per day.

11 Claims, No Drawings

LOW PRESSURE REVERSE OSMOSIS AND NANOFILTRATION MEMBRANES AND METHOD FOR THE PRODUCTION THEREOF

BACKGROUND OF THE INVENTION

This invention pertains to reverse osmosis or nanofiltration membranes used for desalination of water or removal of other solutes from liquids. There is an ever-increasing need for membranes which can perform removal of solutes at lower operating pressures, thus reducing energy requirements. The goal of development efforts is to increase the water permeability of such membranes while limiting the amount of salt or other solute passage. U.S. Pat. Nos. 4,765,897 and 4,812,270 describe the use of strong mineral acids followed by treatment of rejection-enhancing agents to produce low pressure water softening membranes. However, these membranes are limited to 95 percent or less rejection of magnesium sulfate and even lower rejection of sodium chloride. A further disadvantage of the prior art processes is the requirement for an additional polymeric treatment step to repair the damage to the salt rejecting layer of the membrane caused by the strong mineral acid treatment step.

Desirable therefore are high flux, higher solute rejection membranes operable at very low pressures which can be prepared by an efficient one-step treatment process. Specifically desired in nanofiltration applications is a membrane which has a flux of at least 15 gallons per square foot per day (gfd) and a sodium chloride rejection of at least about 20% when pressurized to 75 pounds per square inch (psi) using 0.05 weight percent sodium chloride. When tested on 0.2 weight percent magnesium sulfate under this pressure rejection should typically be at least about 90%.

SUMMARY OF THE INVENTION

The subjects of the present invention are improved low pressure reverse osmosis and nanofiltration membranes and the process for their preparation. These membranes are produced by treating existing reverse osmosis membranes to significantly and uniquely enhance their properties. More specifically, such enhancement is obtained by contacting the salt rejecting layer of a crosslinked polyamide reverse osmosis membrane with an organic sulfonic acid compound, followed by optional drying at moderate temperature for a duration adequate to yield a membrane with a flux of at least about 15 gfd and sodium chloride rejection of at least about 20 percent when tested on 0.05 weight percent sodium chloride at 75 psi and 25° C. This membrane requires no additional treatment involving rejection enhancing agents and can typically reject over 95 percent magnesium sulfate as a 0.2 weight percent aqueous concentration under the same test pressure. (As used herein, an "organic sulfonic acid compound" is one which is formed directly as an organic acid or which has been formed indirectly from an organic acid salt.)

Membranes of this invention prepared by this novel process exhibit significantly higher divalent ion rejections at similar fluxes than membranes treated by prior art acid processes. Additionally, the current invention is more economical than such prior art acid processes.

DETAILED DESCRIPTION AND PREFERRED EMBODIMENTS

Crosslinked polyamide reverse osmosis membranes prepared via various starting materials and techniques are well described. Examples of such membranes can be found in U.S. Pat. Nos. 4,259,183, 4,277,344, 4,520,044, 4,761,234, 4,872,984, 5,254,261, and 5,576,057. U.S. Pat. No. 5,576,057 describes a useful illustrative example in which crosslinked aromatic polyamide membranes are prepared via an interfacial reaction of monomers.

It is preferable that the untreated reverse osmosis membrane has at least 90% rejection and at least 15 gfd flux when tested on 1500 parts per million (ppm) sodium chloride at 150 psi and 25° C. More preferably this membrane has sodium chloride rejection from about 95 to about 99 percent with flux from about 15 to about 40 gfd under these test conditions.

Prior art reverse osmosis membranes in flat sheet, tubular, and hollow fiber forms are suitable for the disclosed treatment, provided they contain a crosslinked polyamide salt rejecting layer. Particularly preferred are thin film composite membranes. Thin film composite membranes may be prepared by a number of techniques commonly practiced for these membranes and particularly preferred are those prepared via interfacial polymerization onto a porous support structure. The porous support may be flat sheet, tubular or hollow fiber form.

Generally, the porous support contains a high porosity and uniformity of pore size. Preferable are the organic polymeric types whose surface pores range in size from about 10–1000 nanometers and most preferably from 50–500 nanometers. Particularly preferable are porous supports made from polysulfones and polyethersulfones.

In the typical interfacially polymerized polyamide composite membrane, the porous support is coated with an aqueous solution containing a polyfunctional amine reactant and, optionally, other compounds such as amine salts and/or surfactants. This amine-coated porous support is then contacted with a water-insoluble solvent containing a polyfunctional acyl halide reactant. This solvent is generally a hydrocarbon though other types may be used provided they do not interfere with the polymerization reaction or impair the performance of the porous support layer. Interfacial composite polyamide membranes as taught in U.S. Pat. Nos. 4,277,344, 4,872,984 and 5,576,057 are especially preferred.

The polyamide skin layer of a reverse osmosis membrane is coated with a solution containing an organic sulfonic acid compound. These acids alter the physical characteristics of the polyamide layer such that both water permeability and salt passage are increased. While not bound by any theory, it is hypothesized that the sulfonic acid compound swells the crosslinked polyamide and solvates the uncrosslinked polyamide structures making up the membrane skin layer. These solvated fragments are then removed from the crosslinked film matrix leaving behind a more permeable polymeric skin layer.

Examples of sulfonic acid compounds include simple alkyl and aromatic sulfonic and disulfonic acids. These compounds may contain other functional groups such as carboxylic acid, hydroxy, alkoxy and halo groups as long as they do not prevent the desired solvency behavior. Specific examples include but are not limited to sulfoacetic acid, sulfobenzoic acids, sulfoisophthalic acids, sulfophthalic acids, sulfosalicylic acids, sulfosuccinic acid, hydroxybenzene sulfonic acids, hydroxybutane sulfonic acids and dihydroxybenzene sulfonic and disulfonic acids. The sulfonic acid is preferably a low molecular weight alkyl or fluoroalkyl sulfonic acid or mixtures thereof. Methanesulfonic acid particularly is preferred with concentrations ranging from about 5 to 100 volume percent demonstrating useful results.

The organic sulfonic acid concentration is effective over a wide range depending, upon the contact time and temperature and subsequent drying temperature. For example, a 100% acid solution contacted briefly then rinsed free of acid with little or no drying provides a similar result as a 20% acid solution contact without rinsing and dried at elevated temperature. In general, the higher the acid concentration, the longer its contact time, the hotter its contact temperature, and the hotter its drying time, the more permeable is the resultant polyamide composite membrane. Typically the membrane treatment solution is from about 10 to about 30 volume percent acid when elevated temperature drying is performed without removing the acid residue residual from the membrane. Alternatively, greater than about 50% acid concentration is typically used if rinsing is performed prior to drying the membrane. Other solvents besides water may advantageously be used, particularly those which swell the polyamide layer and/or decrease the surface tension of the treatment solution. It is believed that this behavior encourages penetration of the acid into the polyamide and enhances the treatment effect, Care should be taken, however, that such solvents do not adversely affect the underlying porous support or interfere with the action of the acid on the polyamide layer.

These solvents should also be capable of yielding homogeneous solutions with the acid and with water, Preferred solvents are alcohols, glycols, alkoxy alcohols, and carboxylic acids.

Optional additives, either solids or liquids, may be included in the acid treatment solution for the purpose of improving coating uniformity or drying performance as long as they also meet the requirements of solution compatibility discussed above. Examples include surfactants and glycols.

The organic acid solution can be coated onto the polyamide membrane by any number of practical techniques commonly available including dipping, spraying, sheeting, roll coating, etc, as long as it is applied evenly. It is typical to apply from about 1–15 and, more preferably, about 3–9 grams of acid per square meter of membrane. The application of the acid may be performed at ambient or elevated temperature depending on the desired effect, In general, the longer the contact time and temperature of the acid, the greater the permeability increasing effect of the treatment. Drying the acid-treated membrane is carried out using commonly available methods such as forced air, convection, infrared, etc. as long as the heat used is not degredative to performance of the treated membrane. Temperatures from ambient to about 130° C. are preferred with 60°–100° C. being most preferred and forced air is the most preferred drying mode. Heating the acid-treated membrane is necessary for the lower acid concentration applications in order to achieve the desired increase in membrane permeability, When using 100% methanesulfonic acid, however, no heating is required due to its potency as a solvent/swelling agent and it may even be rinsed off with water after only a brief contact period. The particular combination of acid strength and drying temperature can be optimized together to achieve the desired membrane performance, Though not generally necessary, optional rinses or neutralization steps may be performed on the acid-treated membrane in order to remove acidic residue on the surface of the membrane. Water may be used as a rinse for this purpose or in the case of neutralization, alkaline solutions may be used. Preferred examples of alkaline compounds useful in neutralizing solutions include sodium bicarbonate, sodium carbonate, and ammonium carbonate.

As an example of one embodiment of the invention, a thin film crosslinked polyamide membrane is coated with 10 percent methanesulfonic acid, 27 percent ethanol, 63 percent water solution using a soft woven Dacron® cloth. The coated membrane is then dried in an air oven at about 60° C. to about 100° C. for about 1 to about 10 minutes. Longer acid contact times and higher drying temperatures generally yield membranes with higher fluxes and lower salt rejections.

Following the treatment by acid, the nanofiltration or reverse osmosis membrane will typically provide rejections of sodium chloride in excess of 20 percent and magnesium sulfate rejections in excess of 90 percent with much greater water fluxes than the untreated original membrane. Preferably the acid-treated membrane will have a flux of at least about 15 gfd and a rejection of at least 20 percent when tested under reverse osmosis conditions at 75 psi on 0.05 weight percent sodium chloride. Given the operable range of this process one can achieve fluxes over 100 gfd with a sodium chloride rejection of about 30 percent or a sodium chloride rejection of over 97 percent with a water flux of about 20 gfd using the above test conditions.

Unlike prior art treatment as in U.S. Pat. No. 4,765,897, this invention provides membranes with high salt rejection without need of rejection enhancing agents. The high temperatures (100°–140° C.) used with mineral acids in the prior art apparently degrade the polyamide skin layer such that repair by rejection enhancing becomes necessary. It is now demonstrated that the treatment of polyamide membranes with organic sulfonic acids at ambient to moderate temperatures can be carried out in a single step with improved results.

The following examples demonstrate the utility of the invention with the understanding that these particular examples in no way limit the scope of the invention. Acid and solvent components are stated as percent by volume whereas the test solutes sodium chloride and magnesium sulfate are stated as percent by weight.

Examples 1–10

Comparative Example A

The source of polyamide composite membrane used in all examples (a commercial product designated ESPA-1 manufactured and sold by Hydranautics of Oceanside, Calif.) was tested to establish a reference water flux and salt rejection from a 0.05 percent solution of sodium chloride at 75 psi and 25° C.

Solutions of 5–100% methanesulfonic acid (MSA) in water were coated onto this same source of membrane by either an inverted dip of the surface for two seconds or a full immersion for one minute at room temperature. After draining off the excess acid solution, the membrane samples were given various forced air drying. Most of the examples were given a deionized (DI) water rinse for 1 minute as an optional step followed by room temperature air drying. All the membrane samples were given the same test for an 18-hour period with results as shown in Table 1.

TABLE 1

| Example | MSA, % Conc. | Contact Method | Dry °C. | Rinse | RT Dry | Flux gfd | NaCl % Rejection |
|---|---|---|---|---|---|---|---|
| A | — | — | — | — | - | 14.9 | 98.75 |
| 1 | 5 | Dip | 15 sec 27°/ 30 sec 56° | Dip | + | 24.1 | 97.27 |
| 2 | 10 | Immerse | 5 min 56° | Dip | + | 26.6 | 95.91 |
| 3 | 10 | Dip | 2 min 27° | — | - | 27.1 | 95.01 |
| 4 | 10 | Dip | 10 min 56° | Dip | + | 31.7 | 93.41 |
| 5 | 15 | Dip | 5 min 55° | Dip | + | 25.7 | 96.58 |
| 6 | 15 | Dip | 30 sec 27°/ 2 min 100° | — | - | 32.3 | 86.62 |
| 7 | 30 | Dip | 10 min 56° | Dip | + | 35.6 | 92.67 |
| 8 | 60 | Immerse | — | Immerse | + | 19.3 | 94.05 |
| 9 | 100 | Dip | — | Immerse | + | 53.6 | 78.90 |
| 10 | 100 | Dip | 10 min 56° | Dip | + | 63.0 | 67.65 |

As can be seen from the performance in Table 1, treatment of the polyamide composite membrane with organic sulfonic acid dramatically increases the water permeability by 1½–4 times while maintaining relatively high sodium chloride rejection. In general, the higher the MSA concentration, the greater the increase in membrane permeability. With MSA concentrations >60% it is possible to achieve good results without any heating or drying step, unlike prior art processes.

Examples 11–15

Trifluoromethanesulfonic acid (TFMSA) solutions of varying concentration in water at room temperature were dripped onto the surface of ES PA-1 membranes using a pipette. After draining off the excess acid solution, the membranes were dried with forced air at 80° C. for 2½ minutes, rinsed off with DI water and dried briefly at room temperature. Membranes were tested as in the above examples with results as indicated in Table 2,

TABLE 2

| Example | TFMSA % Concentration | Flux (gfd) | NaCl % Rejection |
|---|---|---|---|
| 11 | 10 | 26.6 | 98.43 |
| 12 | 30 | 39.5 | 96.41 |
| 13 | 50 | 46.7 | 95.78 |
| 14 | 75 | 52.2 | 95.02 |
| 15 | 85 | 51.7 | 90.80 |

From the test results of Table 2, it can be seen that treatment of the membrane with the fluorinated sulfonic acid is also quite effective in increasing the water permeability while maintaining high salt rejection.

Examples 16–20

In these examples, ESPA-1 membrane was coated with a solution of 10% methanesulfonic acid, 27% ethanol, 63% water (by volume) using a soft woven Dacron® cloth then air dried first at ambient temperature for 30 seconds then at 80° C. for 1 minute, 20 seconds. As a check of the stability of the acid treated membrane, four-day old membrane test performance is compared against three-month dry stored membranes. It was found that the aged membrane actually produced slightly higher flux and rejection thus confirming the storage stability of these membranes. Various subsequent aqueous rinse treatments are compared against the control non-rinsed membrane with test results obtained in the same way as in the above examples. Results are listed in Table 3.

TABLE 3

| Example | Aging | Solution/ Method Rinse | Temp °C. | Time min | RT Dry | Flux gfd | NaCl % Rejection |
|---|---|---|---|---|---|---|---|
| 16 | 4 days | — | — | — | - | 38.7 | 94.36 |
| 17 | 3 months | — | — | — | - | 45.1 | 95.68 |
| 18 | 3 months | Water soak | 25 | 70 | + | 49.6 | 95.88 |
| 19 | 3 months | Water soak | 45 | 70 | + | 35.8 | 97.32 |
| 20 | 3 months | 1% Na$_2$CO$_3$ filtration | 25 | 3 | + | 66.8 | 89.56 |

The performance results in Table 3 indicate that plain water at ambient temperature yields a slight flux enhancement effect and similar salt rejection compared to the unrinsed control membrane, The 45° C. water rinsed case experienced a 21% reduction in flux and a 38% reduction in salt passage (100-salt rejection) suggesting slight beneficial treatment. Rinsing the acid-treated membrane with 1% sodium carbonate significantly increased the flux and salt passage creating an even more permeable membrane product.

Examples 21–24

ESPA-1 membranes were treated with a solution containing 10% MSA 55% ethanol, 30% water and 6% glycerin. Examples 21–23 were cloth-coated as in the above examples whereas Example 24 had its acid solution vacuum-filtered through the membrane. All treated membranes were air dried, first at ambient temperature for 30 seconds followed by 80° C. air drying for 2 minutes. Aqueous rinse treatments are compared with non-rinsed cases with test results as indicated in Table 4.

TABLE 4

| Example | Contact Method | Solution/ Method Rinse | Temp °C. | Time min | RT Dry | Flux gfd | NaCl % Rejection |
|---|---|---|---|---|---|---|---|
| 21 | Cloth | — | — | — | - | 40.8 | 94.69 |
| 22 | Cloth | Water soak | 25 | 70 | + | 54.0 | 92.96 |
| 23 | Cloth | 1% Na$_2$CO$_3$ | 25 | 70 | + | 48.8 | 94.34 |
| 24 | Flitered | — | — | — | - | 52.4 | 92.70 |

Overall the test results in Table 4 are similar to those of Table 3 with the exception of the 1% sodium carbonate-rinsed case which produced less increase in membrane permeability. The filtered-through acid treatment method appears to produce a slightly higher permeability membrane than the standard cloth-coated case perhaps due to increased penetration and/or treatment contact time.

Examples 25–29

Further utility of this invention is demonstrated in these examples in which ESPA-1 membranes are acid-treated at an elevated temperature without using a subsequent drying step. A 61% by volume aqueous solution of MSA was used as the immersion liquid for membrane samples at 100° C. over varying time increments. After the indicated immersion time, the membrane samples were rinsed off briefly with DI water, soaked in fresh DI water for 5 minutes then dried briefly with ambient air. Test results, obtained as previously mentioned, are listed in Table 5.

TABLE 5

| Example | Contact Time min | Flux (gfd) | NaCl % Rejection |
|---|---|---|---|
| 25 | 10 | 38.6 | 98.18 |
| 26 | 20 | 42.4 | 97.80 |
| 27 | 40 | 51.2 | 96.48 |
| 28 | 80 | 71.2 | 89.27 |
| 29 | 160 | 152. | 28.96 |

The results of Table 5 very clearly demonstrate a controllable increase in membrane permeability as the immersion time was increased. Excellent membrane fluxes and salt rejections were also achieved using an elevated temperature acid solution contact without the elevated temperature drying step.

Examples 30–32

Comparative Example B

Direct treatment of spiral wound membrane filters is performed using 100% MSA solution at ambient temperatures with no subsequent drying step. Two filters were soaked directly in MSA for 1 and 2 hours respectively followed by rinsing with DI water for 5 minutes, and then tested under the above described conditions with results listed in Table 6 below.

TABLE 6

| Example | Soak Time hours | Flux (gfd) | NaCl % Rejection |
|---|---|---|---|
| B | None | 13.5 | 98.90 |
| 30 | 1 | 26.6 | 92.08 |
| 31 | 2 | 40.4 | 90.50 |

As seen in Table 6, it is now demonstrated that, in contrast to prior art, a direct, ambient only, treatment of finished product membrane filters is accomplished. As with all previous examples of this invention, no rejection enhancing step is required to achieve the desired results.

Examples 2, 3, 5 and 16

Comparative Example C

Previous Examples 2, 3, 5 and 16 are compared with prior art U.S. Pat. No. 4,765,897 Examples 12–15 in Table 7. In order to compare the membrane performances obtained from testing on 0.2 percent magnesium sulfate at 75 psi for the present invention with those of the prior art tested at 60 psi, the former test data was normalized to 60 psi with results as listed in Table 7.

TABLE 7

| Example | Description | 75 psi | | 60 psi | | | Flux divided by SP |
|---|---|---|---|---|---|---|---|
| | | Flux gfd | Rejection % | Flux gfd | Rejection % | SP % | |
| C | U.S. 4,765,897 Ex. 12–15 | — | — | 26.6 | 94.4 | 5.60 | 4.75 |
| 2 | Present Invention | 26.5 | 99.49 | 19.4 | 99.32 | 0.68 | 28.5 |
| 3 | Present Invention | 23.6 | 99.22 | 17.3 | 98.93 | 1.07 | 16.2 |
| 5 | Present Invention | 21.3 | 99.72 | 15.6 | 99.62 | 0.38 | 41.1 |
| 16 | Present Invention | 34.8 | 98.81 | 25.5 | 98.37 | 1.63 | 15.6 |

As can be seen in Table 7, the magnesium sulfate rejections of the present invention membranes are considerably higher than those of the prior art membranes which require an additional rejection-enhancing treatment. When comparing Example C with Example 16, the magnesium sulfate passage (SP) of the former is found to be more than 3 times that of the present invention at a similar flux. A figure of merit calculation, which takes into account both flux and the salt passage of membranes to be compared, is used to determine the relative performance ranking. The last column of Table 7 showing these Flux/SP calculations indicates much higher performance values for the present invention membranes than the prior art (U.S. Pat. No. 4,765,897) membranes.

The test results of Table 7 clearly demonstrate superiority of the present invention over the prior art, both in terms of magnesium sulfate rejection and elimination of an additional salt rejection enhancement step. Typical performance of these new membranes is 15–30 gfd flux and greater than 95% rejection of magnesium sulfate when tested on 0.2 weight percent magnesium sulfate at 60 psig.

I claim:

1. A composite membrane useful for reverse osmosis or nanofiltration comprising:
    a supportive porous under-structure; and
    a top layer consisting of a crosslinked polyamide thin film which is adhered to the upper surface of the porous support structure, said top layer having been contacted with a solution of a $C_1$–$C_6$ alkyl, alkenyl, haloalkyl, haloalkenyl, or hydroxy sulfonic or disulfonic acid compound,
    whereby said membrane has a water flux of at least about 15 gfd and a rejection of at least 20 percent when tested an a 0.05 percent aqueous sodium chloride at 75 psi and 25° C.

2. A composite membrane as in claim 1 wherein said crosslinked polyamide comprises the reaction product of an aromatic diamine or triamine and an aromatic triacyl halide.

3. A composite membrane as in claim 2 wherein said crosslinked polyamide comprises the reaction product of an aromatic diamine or triamine, an aromatic triacyl halide and an aromatic diacyl halide.

4. A composite membrane as in claim 1 wherein the porous support is a polyarylethersulfone.

5. A composite membrane as in claim 1 wherein said first membrane comprises a thin film, flat sheet, hollow fiber or tubular membrane.

6. A composite membrane as in claim 1 wherein the membrane is a component of a spiral-wound membrane filter or a plate and frame filter.

7. A composite membrane as in claim 1 wherein said organic sulfonic or disulfonic acid compound comprises a sulfoacetic, sulfosuccinic, methanesulfonic, ethanedisulfonic, or hydroxybutane sulfonic compound or mixtures thereof.

8. A composite membrane as in claim 1 wherein said organic sulfonic acid compound comprises methanesulfonic acid, trifluoromethanesulfonic acid or a mixture thereof.

9. A composite membrane as in claim 1 wherein said solution of an organic sulfonic acid compound comprises said organic sulfonic acid compound dispersed or dissolved in water, alcohol, glycol, alkoxy alcohol or a carboxylic acid or a mixture thereof.

10. A composite membrane as in claim 1 wherein said organic sulfonic acid compound comprises ethanesulfonic acid.

11. A composite membrane as in claim 1 wherein said organic sulfonic acid compound comprises trifluoromethanesulfonic acid.

* * * * *